United States Patent
Mishima et al.

(10) Patent No.: US 8,224,110 B2
(45) Date of Patent: Jul. 17, 2012

(54) IMAGE PROCESSING APPARATUS AND IMAGE PROCESSING METHOD

(75) Inventors: Nao Mishima, Tokyo (JP); Goh Itoh, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 496 days.

(21) Appl. No.: 12/560,838

(22) Filed: Sep. 16, 2009

(65) Prior Publication Data

US 2010/0232697 A1    Sep. 16, 2010

(30) Foreign Application Priority Data

Mar. 16, 2009   (JP) ................................. 2009-063087

(51) Int. Cl.
*G06K 9/40* (2006.01)
*G06K 9/00* (2006.01)
*G06K 9/38* (2006.01)

(52) U.S. Cl. ........ 382/264; 382/168; 382/260; 382/262; 382/266; 382/268; 382/271

(58) Field of Classification Search .................. 382/168, 382/260, 262, 264, 266–269, 271
See application file for complete search history.

(56) References Cited

U.S. PATENT DOCUMENTS

| | | | | |
|---|---|---|---|---|
| 5,512,956 A | * | 4/1996 | Yan .................................. | 348/606 |
| 7,110,612 B1 | * | 9/2006 | Wang ............................. | 382/262 |
| 2002/0159650 A1 | * | 10/2002 | Hiroshige et al. ............ | 382/261 |
| 2002/0172431 A1 | * | 11/2002 | Atkins et al. ................... | 382/260 |
| 2004/0190787 A1 | * | 9/2004 | Nakami ......................... | 382/260 |
| 2005/0213818 A1 | * | 9/2005 | Suzuki et al. .................. | 382/190 |
| 2006/0061673 A1 | * | 3/2006 | Hiroshige et al. ............. | 348/252 |
| 2008/0013836 A1 | * | 1/2008 | Nakamura et al. ............. | 382/209 |
| 2010/0054606 A1 | | 3/2010 | Mishima et al. | |
| 2010/0061651 A1 | | 3/2010 | Mishima et al. | |
| 2010/0079630 A1 | | 4/2010 | Mishima et al. | |

FOREIGN PATENT DOCUMENTS

| | | |
|---|---|---|
| JP | 11-191861 | 7/1999 |
| JP | 11191861 A * | 7/1999 |

* cited by examiner

*Primary Examiner* — Anand Bhatnagar
*Assistant Examiner* — Soo Park
(74) *Attorney, Agent, or Firm* — Oblon, Spivak, McClelland, Maier & Neustadt, L.L.P.

(57) ABSTRACT

An image processing apparatus includes a gradient calculator that calculates a direction and a magnitude of a gradient of each pixel in an input image using neighboring pixel values; a histogram calculator that calculates a Histogram of Oriented Gradients containing plural sampled directions from the directions and the magnitudes of the gradients calculated for the pixels in a region including the pixel being processed; a storing unit that stores plural smoothing filters and associated Histograms of Oriented Gradients; a search unit that calculates errors between Histogram of Oriented Gradients calculated for the pixel being processed and the Histograms of Oriented Gradients stored in the storing unit and searches the Histogram of Oriented Gradients that has the minimum error; and a filter processing unit that acquires one of the smoothing filters stored in association with the Histogram of Oriented Gradients having the minimum error and determines a corrected pixel value of the pixel being processed by filter processing with the acquired smoothing filter.

9 Claims, 8 Drawing Sheets

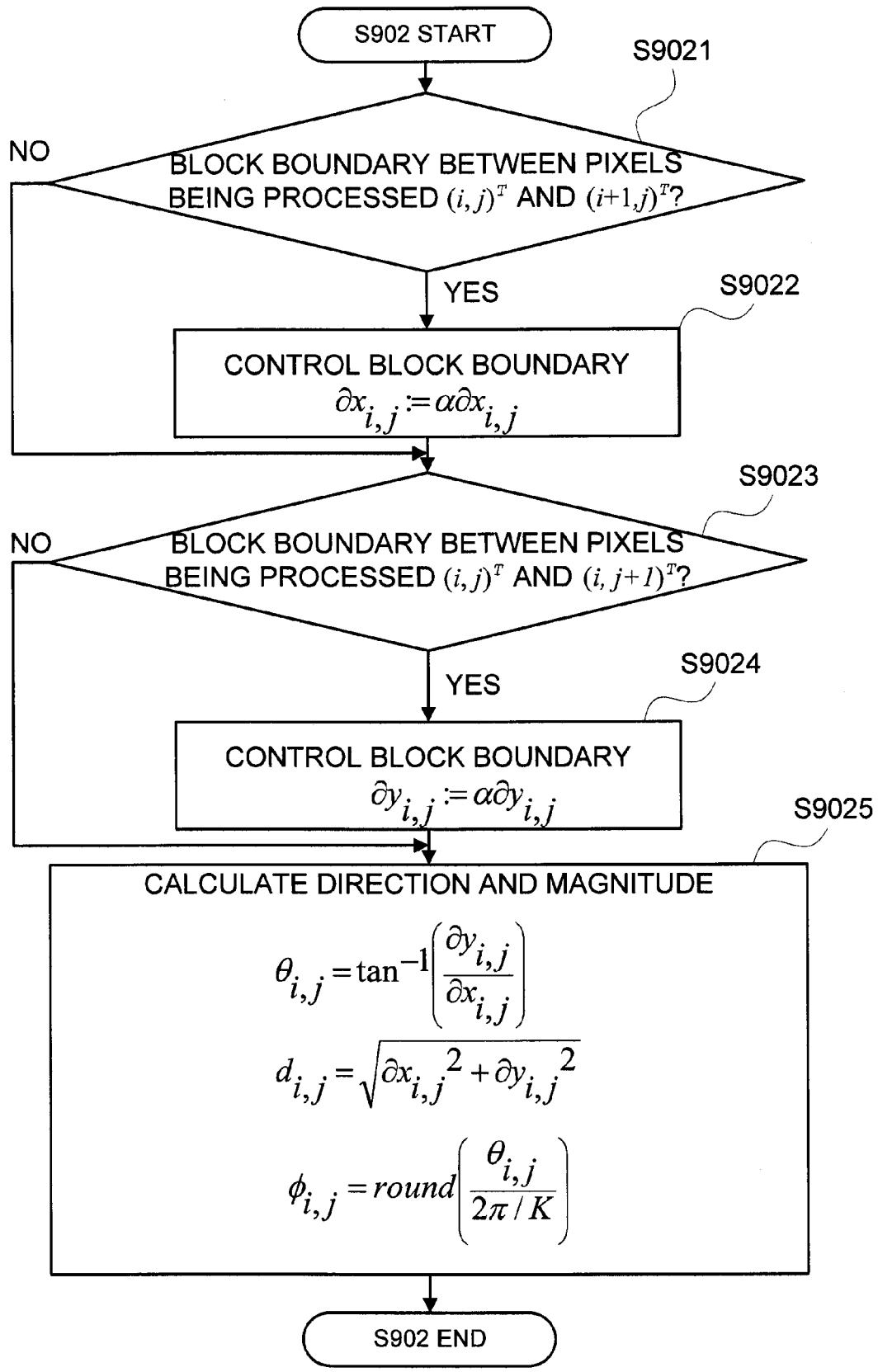

IMAGE PROCESSING APPARATUS AND IMAGE PROCESSING METHOD

CROSS-REFERENCE TO RELATED APPLICATIONS

This application is based upon and claims the benefit of priority from the prior Japanese Patent Application No. 2009-063087, filed on Mar. 16, 2009; the entire contents of which are incorporated herein by reference.

BACKGROUND OF THE INVENTION

1. Field of the Invention

The present invention relates to an image processing apparatus and a method thereof.

2. Description of the Related Art

JP-A 11-191861 (KOKAI) discloses generating a Histogram of Oriented Gradients (HOG) from an input image based on the magnitude and direction of pixel gradients, determining the direction of a bin having the maximum value as an edge direction, and using smoothing means that is suitable for the edge direction and is selected from a plurality of smoothing means set in advance.

With the conventional art mentioned above, however, only the edge direction is taken into consideration for selecting smoothing means, and therefore an adaptive smoothing process cannot be performed for various shapes of edges that are different in intensity and magnitude. This has caused degradation in image quality such as excessive smoothing.

SUMMARY OF THE INVENTION

According to one aspect of the present invention, an image processing apparatus includes a gradient calculator configured to calculate a direction and a magnitude of a gradient of each pixel in an input image using neighboring pixel values; a histogram calculator configured to calculate a Histogram of Oriented Gradients, which contains a plurality of sampled directions, from the directions and the magnitudes of the gradients calculated for the pixels in a region including the pixel being processed of the input image; a storing unit configured to store a plurality of smoothing filters and a template of Histograms of Oriented Gradients in association with each other; a search unit configured to calculate errors between the Histogram of Oriented Gradients calculated for the pixel being processed and the Histogram of Oriented Gradients stored in the storing unit and search the Histograms of Oriented Gradients stored in the storing unit for the Histogram of Oriented Gradients that has the minimum error; and a filter processing unit configured to acquire one of the smoothing filters that is stored in association with the Histogram of Oriented Gradients having the minimum error from the storing unit and determine a corrected pixel value of the pixel being processed by filter processing with the acquired smoothing filter.

According to another aspect of the present invention, an image processing method includes calculating a direction and a magnitude of a gradient of each pixel in an input image using neighboring pixel values; calculating a Histogram of Oriented Gradients, which contains a plurality of sampled directions, from the directions and the magnitudes of the gradients calculated for the pixels in a region including the pixel being processed of the input image; calculating, while referring to a storage unit that stores a plurality of smoothing filters and Histogram of Oriented Gradients in association with each other, errors between the Histogram of Oriented Gradients calculated for the pixel being processed and the Histogram of Oriented Gradients stored in the storing unit; searching the Histogram of Oriented Gradients stored in the storing unit for the Histogram of Oriented Gradients that has the minimum error; acquiring one of the smoothing filters that is stored in association with the Histogram of Oriented Gradients having the minimum error from the storing unit; and determining a corrected pixel value of the pixel being processed by filter processing with the acquired smoothing filter.

BRIEF DESCRIPTION OF THE DRAWINGS

FIG. 10 is a flow chart of a process of calculating the magnitude and direction of a pixel gradient of the second embodiment.

DETAILED DESCRIPTION OF THE INVENTION

Figure 1:
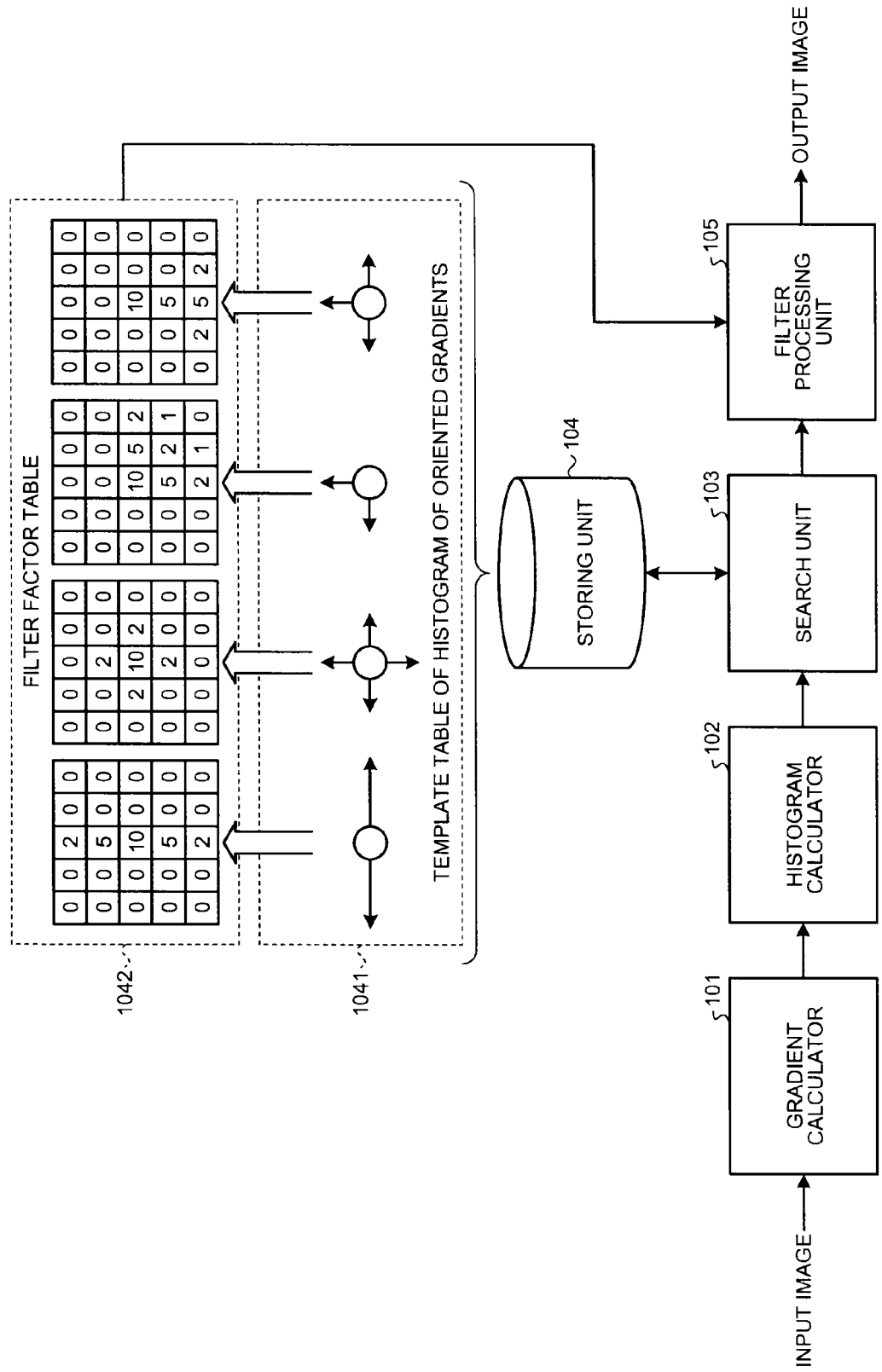
FIG. 1 is a block diagram of an image processing apparatus according to a first embodiment.

Exemplary embodiments of the present invention will be described in detail below. Note that configurations and processes having the same operations are denoted by common reference characters, and overlapping descriptions are eliminated.

As illustrated in FIG. 1, an image processing apparatus according to a first embodiment has a gradient calculator 101, a histogram calculator 102, a search unit 103, a storing unit 104 and a filter processing unit 105.

The gradient calculator 101 calculates the direction and the magnitude of a gradient for each pixel of an input image using neighboring pixel values. The histogram calculator 102 calculates a Histogram of Oriented Gradients (HOG), which contains a plurality of sampled directions, using the directions and the magnitudes of gradients calculated for pixels in a region including a pixel being processed of the input image.

In the storing unit 104, a plurality of smoothing filters and Histograms of Oriented Gradients are stored in association with each other. A template table 1041 of Histogram of Oriented Gradients stores the plurality of Histograms of Oriented Gradients. A filter factor table 1042 stores filter factors in association with the Histogram of Oriented Gradients. The stored Histogram of Oriented Gradients are referred to as "templates of Histogram of Oriented Gradients" since they are representative histograms corresponding to the filter factors. The templates of Histogram of Oriented Gradients are produced in advance by learning using a sample image, or the like. The method of learning is to be described later.

The search unit 103 searches the templates of Histogram of Oriented Gradients stored in the storing unit 104 for a Histogram of Oriented Gradients that has a minimum error with respect to the Histogram of Oriented Gradients calculated for the pixel being processed.

The filter processing unit 105 obtains a corrected pixel value of the pixel being processed using the weighted sum of pixel values of the region including the pixel being processed. Weighting factors of the smoothing filter, which is stored in the storing unit 104 in association with the Histogram of Oriented Gradients having the minimum error, are used.

Figure 2:
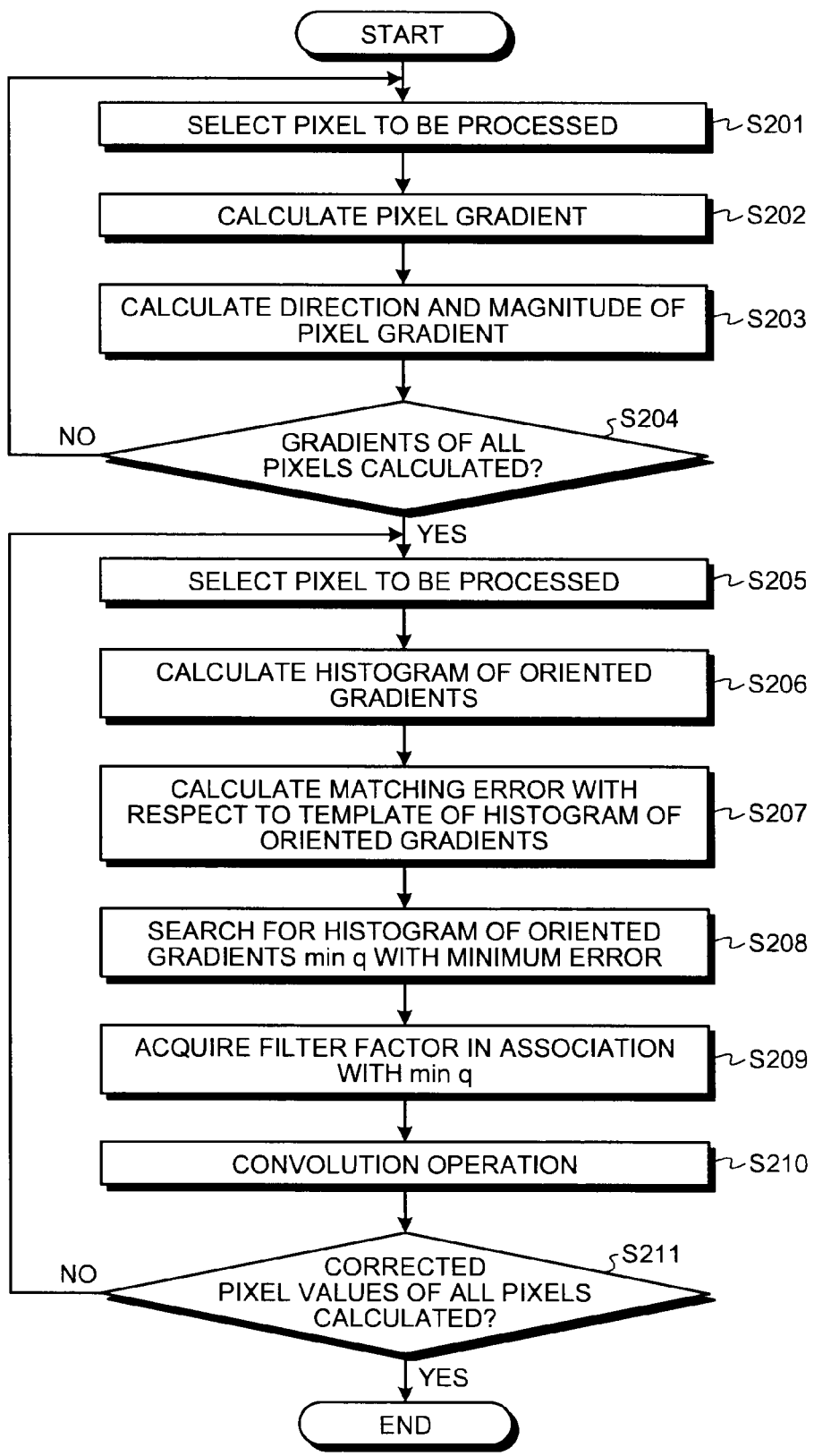
FIG. 2 is a flow chart of the image processing of the first embodiment.

Referring to FIG. 2, image processing by the image processing apparatus according to the first embodiment is described. First, the gradient calculator 101 selects a pixel to be processed from an input image (step S201). Note that $(i, j)^T$ represents a pixel position, and $I_{i,j}$ represents a pixel value that a pixel positioned at $(i, j)^T$ has. T indicates transposition of a vector or a matrix.

Next, the gradient calculator 101 calculates a gradient of each pixel of an input image using a difference value between a pixel value of a pixel being processed and pixel values of pixels positioned in the neighborhood (step S202). For example, when using a forward difference, an x-direction pixel gradient ∂x and a y-direction pixel gradient ∂y at a position $(i, j)^T$ can be defined as the following set of expressions (1).

$$\partial x_{i,j} = I_{i+1,j} - I_{i,j}$$

$$\partial y_{i,j} = I_{i,j+1} - I_{i,j} \quad (1)$$

Figure 3:
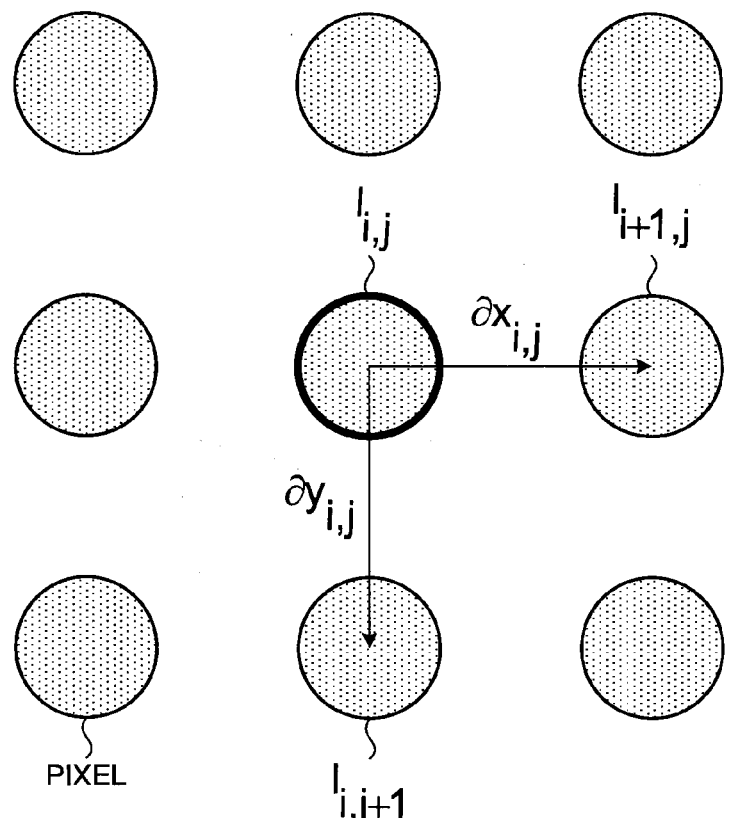
FIG. 3 is an explanatory view of a pixel gradient.

Referring to FIG. 3, a method of calculating a gradient is described. As illustrated in FIG. 3, the pixel being processed, for which a gradient is to be calculated, is a pixel positioned at $(i, j)^T$. The positions of two pixels adjacent to the pixel at $(i, j)^T$ in directions of forward differences of the x direction and the y direction are $(i+1, j)^T$ and $(i, j+1)^T$. The gradient vector $v_{i,j}$ at the position $(i, j)^T$ can be defined as the following expression (2).

$$v_{i,j} = (\partial x_{i,j}, \partial y_{i,j})^T \quad (2)$$

Although an example of using a forward difference has been described as a method of calculating a pixel gradient, a backward difference or a central difference may be alternatively used. A general gradient operator, such as Sobel, may also be used.

Next, from the gradient vector $v_{i,j}$ at the position $(i, j)^T$ calculated in step S202, the gradient calculator 101 calculates a rotation angle θ, which represents the direction of an edge, and a magnitude d (step S203). The direction θ obtained by rotating the direction of the gradient vector $v_{i,j}$ by 90 degrees and the magnitude d are calculated using a set of expressions (3).

$$\theta_{i,j} = \tan^{-1}\left(\frac{\partial y_{i,j}}{\partial x_{i,j}}\right) + \frac{\pi}{2} \quad (3)$$

$$d_{i,j} = \sqrt{\partial x_{i,j}^2 + \partial y_{i,j}^2}$$

Figure 4:
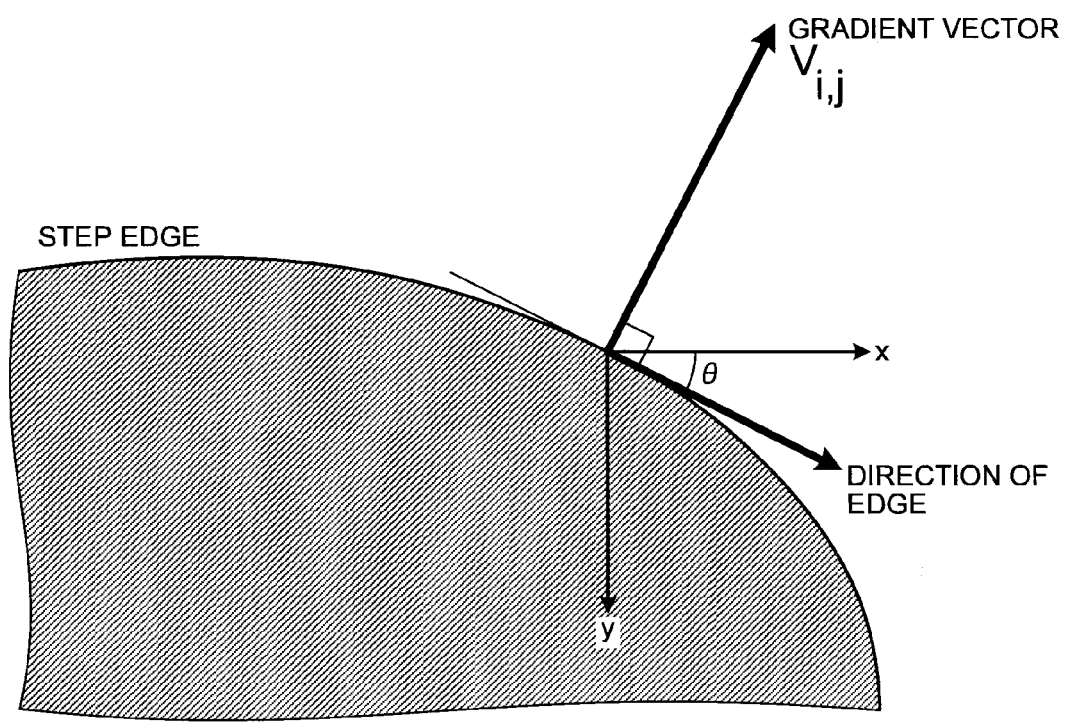
FIG. 4 is an explanatory view of a relation between a gradient vector and the direction of an edge.

The gradient calculator 101 holds the calculated direction and magnitude of each pixel's edge. The relationship between an edge, the gradient vector $v_{i,j}$, and the rotation angle θ is illustrated in FIG. 4. In FIG. 4, an example is illustrated in which a step edge lies along a boundary between a region with rightward ascending diagonals and a white region in an image. Note that an "edge" is a linear region in which pixel values in the image sharply change. The gradient vector $v_{i,j}$ described above represents the direction normal to the boundary line that forms the edge. The rotation angle θ that represents the direction of the edge is defined as illustrated in the drawing. The angle that the tangential direction of the edge forms with the x-axis is the rotation angle θ.

Next, it is determined whether the directions and the magnitudes of the gradients have been calculated for all pixels in the input image (step S204). If the result is "NO", then the process returns to step S201 and selects the next pixel to be processed. If the result is "YES", then the process proceeds to step S205, and a pixel to be processed is selected (step S205).

Next, the histogram calculator 102 calculates the Histogram of Oriented Gradients from pixels including the pixel being processed (step S206). The Histogram of Oriented Gradients that has intensities for respective directions is produced from the directions and magnitudes of the pixel gradient vectors. In the Histogram of Oriented Gradients, bins of the histogram that are obtained by dividing 360 degrees by K are prepared, and the magnitudes d of the pixel gradient vectors calculated in step S203 for pixels in the neighborhood of the pixel being processed are added into each bin. Initially, the direction of the edge is quantized into K levels.

$$\phi_{i,j} = \text{round}\left(\frac{\theta_{i,j}}{2\pi/K}\right) \quad (4)$$

where round ( ) is a function for rounding off, 2π/K is a quantizing step, and φ is the quantized direction of the gradient vector. A Histogram of Oriented Gradients h[ ] is initialized at 0 as follows.

$$h[k] = 0, (k=0, \ldots, K-1)$$

where [k] means a bin of a histogram. Assuming that a Histogram of Oriented Gradients is produced in a square area of (2r+1, 2r+1) centered about the pixel being processed, the Histogram of Oriented Gradients can be calculated as follows.

For the point of $< r \leq m \leq r$, $< r \leq n \leq r$ $$h[\phi_{i+m,j+n}] = h[\phi_{i+m,j+n}] + d_{i+m,j+n} \quad (5)$$

The produced Histogram of Oriented Gradients is held by the histogram calculator 102.

Figure 5A:
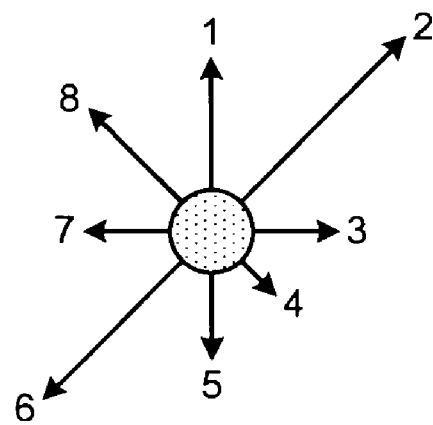
FIGS. 5A and 5B are explanatory views of a histogram of oriented gradients.
Figure 5B:
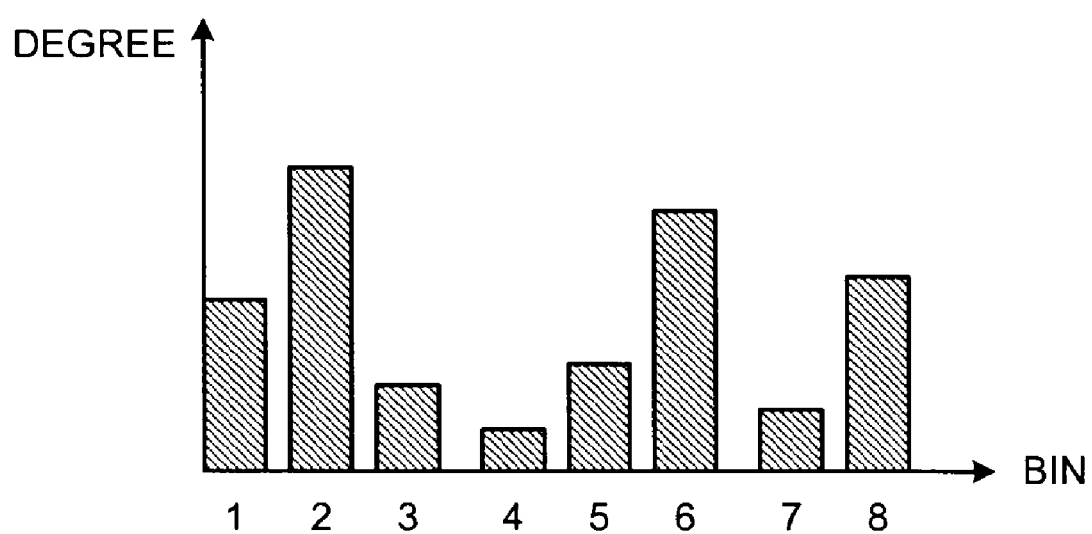

Referring to FIGS. 5A and 5B, a Histogram of Oriented Gradients is described. FIG. 5A schematically illustrates an example of a Histogram of Oriented Gradients with the direction quantized in eight directions. The result of adding magnitudes of pixel gradients calculated for pixels in a region including the pixel being processed for each direction is represented as the magnitude of an arrow. FIG. 5B illustrates an example of a Histogram of Oriented Gradients produced for the pixel being processed illustrated in FIG. 5A. The horizontal axis indicates the number of each bin. The degree indicates the added magnitudes of the histogram.

Next, the search unit 103 determines a matching error between each of templates of Histogram of Oriented Gradients held in the template table 1041 of Histogram of Oriented Gradients of the storing unit 104 and the Histogram of Oriented Gradients calculated in step S206 (step S207), and searches for a template of Histogram of Oriented Gradients with which the matching error is minimum (step S208). That is, matching evaluation values are calculated between the Histogram of Oriented Gradients of the pixel being processed and templates of Histogram of Oriented Gradients in the template table of Histogram of Oriented Gradients 1041. A template of Histogram of Oriented Gradients whose evaluation value is the smallest in the calculated evaluation values is selected. A matching evaluation value E represents an error between the histograms. The smaller the evaluation value representing an error is, the higher similarity is indicated. The Histogram of Oriented Gradients of the pixel being processed calculated in step S206 is expressed as $h_{i,j}$. A qth template in templates of Histogram of Oriented Gradients is expressed as $t_q$. The evaluation function using absolute difference values can be defined as in expression (6).

$$E(t_q, h_{i,j}) = \sum_{0 \leq k \leq K-1} |t_q[k] - h_{i,j}[k]| \quad (6)$$

Alternatively, as expressed in expression (7), sum of squared differences may be used.

$$E(t_q, h_{i,j}) = \sum_{0 \leq k \leq K-1} (t_q[k] - h_{i,j}[k])^2 \quad (7)$$

If there are Q templates of Histogram of Oriented Gradients as a whole, $q=0,1,\ldots,Q-1$ Template matching by the whole search results in expression (8).

$$\min q = \arg\min_{0 \leq q \leq Q-1} E(t_q, h_{i,j}) \quad (8)$$

A template tq providing the minimum value is the template of Histogram of Oriented Gradients that is closest to the Histogram of Oriented Gradients $h_{i,j}$ as a result of template matching. Expression (8) means selecting a template min q of Histogram of Oriented Gradients having the smallest evaluation value by comparing factors one by one for templates represented by template q=0, 1, . . . , Q−1, which are held in the template of Histogram of Oriented Gradients 1041. The function arg min f(x) means x that provides the minimum value of f(x).

Next, the filter processing unit 105 acquires a filter factor stored in association with min q, which is determined in step S208, in the storing unit 104 (step S209).

Using the filter factor acquired in step S209, the filter processing unit 105 determines a corrected pixel value of the pixel being processed by a convolution operation of neighboring pixel values (step S210). Assuming that the filter factor acquired in step S209 is w, the convolution can be defined as in expression (9). The left side of expression (9) is a corrected pixel value of the pixel being processed.

$$\tilde{I}_{i,j} = \sum_{-r \leq m \leq r, -r \leq n \leq r} w(m,n) I_{i+m, j+n} \quad (9)$$

Next, it is determined whether corrected pixel values have been calculated for all pixels of the input image (step S211). If the result is "NO", then the process returns to step S205, and the next pixel is selected as the pixel to be processed. If the result is "YES", then the correction process of pixel values is finished.

A description on filter factors is given in detail. Any filter factor may be stored in the filter factor table 1042 as long as it is suitable for a region of an image corresponding to a Histogram of Oriented Gradients stored in association with the filter factor. It is preferable that filter factors of a smoothing filter decrease as a distance from the pixel being processed increases. Filter factors, of which decreasing rate is high in a direction along which the gradient of the associated Histogram of Oriented Gradients is large and is low in a direction along which the gradient of the Histogram of Oriented Gradients is small, are preferable An example using an anisotropic Gaussian function as a weight is described.

Figure 6:
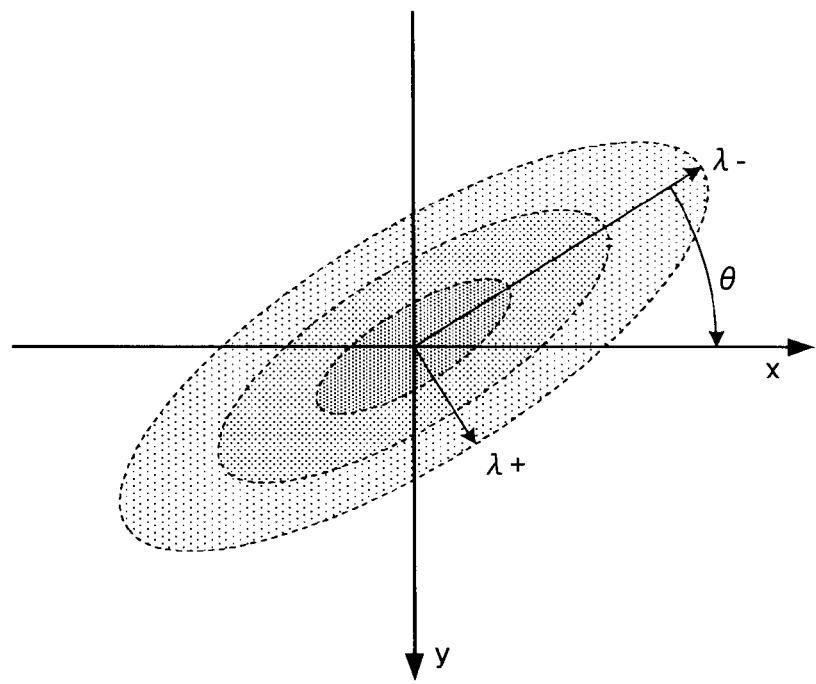
FIG. 6 is an explanatory view of an anisotropic Gaussian function.

FIG. 6 illustrates an anisotropic Gaussian function. The anisotropic Gaussian function is a Gaussian function, in which standard deviations of two axes are different, allowing a pattern rotating about the x-axis. The filter factor using the anisotropic Gaussian function is such that the weight increases to approach to 1 as the position is closer to the center while the weight approaches to 0 as the position is more apart from the center, and is defined as follows.

$$w(m,n) = \quad (10)$$
$$\frac{1}{Q}\exp\left(-\frac{1}{2}(m,n)\begin{bmatrix}\cos\theta & -\sin\theta \\ \sin\theta & \cos\theta\end{bmatrix}\begin{bmatrix}\lambda_+ & 0 \\ 0 & \lambda_-\end{bmatrix}\begin{bmatrix}\cos\theta & \sin\theta \\ -\sin\theta & \cos\theta\end{bmatrix}\begin{bmatrix}m \\ n\end{bmatrix}\right)$$

$$Q = \sum_{-r \leq m \leq r, -r \leq n \leq r}\exp\left(-\frac{1}{2}(m,n)\begin{bmatrix}\cos\theta & -\sin\theta \\ \sin\theta & \cos\theta\end{bmatrix}\begin{bmatrix}\lambda_+ & 0 \\ 0 & \lambda_-\end{bmatrix}\begin{bmatrix}\cos\theta & \sin\theta \\ -\sin\theta & \cos\theta\end{bmatrix}\begin{bmatrix}m \\ n\end{bmatrix}\right)$$

where Q is a normalization constant for causing the total sum of weights to be 1. The square area of (2r+1, 2r+1) centered about the pixel being processed is set as a target range for filtering, and the foregoing weight is to be calculated for a point in the range of $r \leq m \leq r$, . . . , $r \leq n \leq r$. The symbol θ represents an angle from the x-axis, and $\lambda_+$ and $X_-$ are the reciprocals of dispersions of two axes of the anisotropic Gaussian function, respectively. Filter factors are retained in the filter factor table 1042 of the storing unit 104. In the foregoing filter factor, one pattern is formed using three parameters $(\theta, \lambda_+, \lambda_-)$. Accordingly, the parameters are each quantized, and a finite number of filter factors are retained in the table. For example, 16 patterns are conceivable as follows.

$(\theta = 0, \lambda_+ = 1, \lambda_- = 1)$, $(\theta = \frac{\pi}{4}, \lambda_+ = 1, \lambda_- = 1)$, $(\theta = \frac{\pi}{2}, \lambda_+ = 1, \lambda_- = 1), (\theta = \frac{3\pi}{4}, \lambda_+ = 1, \lambda_- = 1)$ $(\theta = 0, \lambda_+ = 2, \lambda_- = 1)$, $(\theta = \frac{\pi}{4}, \lambda_+ = 2, \lambda_- = 1)$, $(\theta = \frac{\pi}{2}, \lambda_+ = 2, \lambda_- = 1), (\theta = \frac{3\pi}{4}, \lambda_+ = 2, \lambda_- = 1)$ $(\theta = 0, \lambda_+ = 1, \lambda_- = 2)$, $(\theta = \frac{\pi}{4}, \lambda_+ = 1, \lambda_- = 2)$, $(\theta = \frac{\pi}{2}, \lambda_+ = 1, \lambda_- = 2), (\theta = \frac{3\pi}{4}, \lambda_+ = 1, \lambda_- = 2)$ $(\theta = 0, \lambda_+ = 2, \lambda_- = 2)$, $(\theta = \frac{\pi}{4}, \lambda_+ = 2, \lambda_- = 2)$, -continued $$\left(\theta = \frac{\pi}{2}, \lambda_+ = 2, \lambda_- = 2\right), \left(\theta = \frac{3\pi}{4}, \lambda_+ = 2, \lambda_- = 2\right)$$

Patterns are not limited to these patterns. As many patterns as the table size can accept may be used.

Next, a method of producing a template of Histogram of Oriented Gradients, for example, by learning from a sample image is described in detail. As the method of learning, a method as follows can be used. When a parameter set of an object, for which a template of Histogram of Oriented Gradients is to be produced, is $(\theta, \lambda_+, \lambda_-)_1$, a region corresponding to the object parameter set $(\theta, \lambda_+, \lambda_-)_1$ is extracted from the sample image, and the average of Histograms of Oriented Gradients in the extracted region is used as a template of Histogram of Oriented Gradients.

To detect the object parameter set $(\theta, \lambda_+, \lambda_-)_1$ from the sample image, principal component analysis of pixel gradients can be used. The direction of the main gradient vector in a region centered about the pixel being processed (referred to as a "kernel", and, in general, a square centered about the pixel being processed is often used) can be determined by principal components of an x-direction gradient and a y-direction gradient in the kernel.

Figure 7:
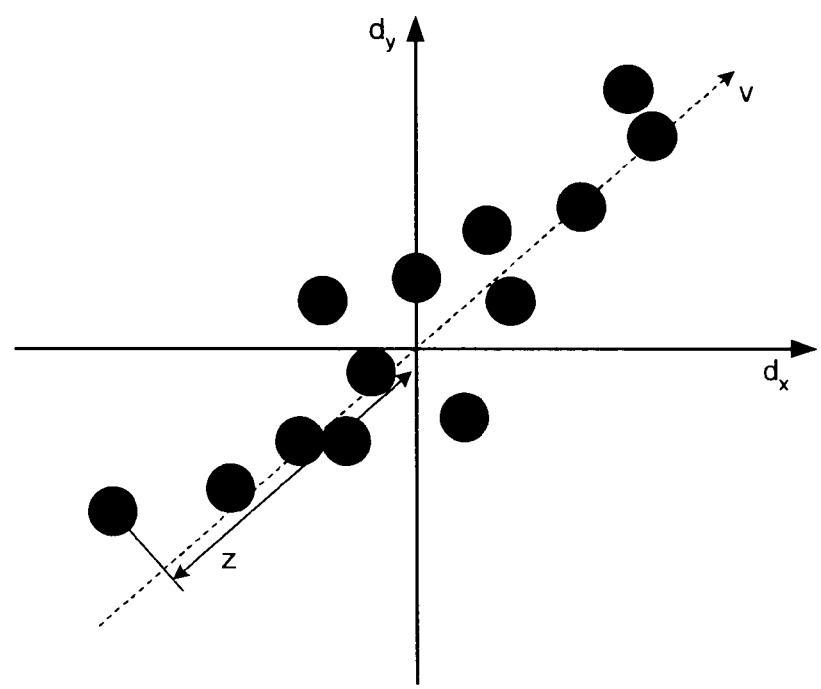
FIG. 7 is an explanatory view of a principal component analysis.

An example of the principal component analysis result is illustrated in FIG. 7. As illustrated in FIG. 7, the primary component axis of the distribution can be determined. The principal component analysis for determining v of a gradient vector corresponds to determining the primary component axis of the distribution illustrated in FIG. 7.

A matrix in which gradients in the kernel are arranged is defined as follows. Note that i expressed in bold represents a vector.

$$i = (i, j)^T$$

$$G = \begin{bmatrix} \partial x_{i+0} & \partial y_{i+0} \\ \vdots & \vdots \\ \partial x_{i+s} & \partial y_{i+s} \end{bmatrix}$$

where s represents a relative pixel position in the kernel. When G is projected on the axis of the gradient vector, the result is as follows.

$$z = Gv \quad (11)$$

The principal component axis means an axis around which the distribution of data points z is maximized. Therefore, the principal component analysis can be defined as a distribution maximizing problem as follows.

$$\max_{v,\lambda} \text{Var}(z) + \lambda(1 - v^T v) \quad (12)$$

$$\text{Var}(z) = \frac{1}{Num(N)} \sum_{s \in N} (z_s - 0)^2 = \frac{1}{Num(N)} \sum_{s \in N} z_s^2$$

where $\lambda > 0$ is Lagrange's undetermined multiplier, or a parameter of a constraint for preventing a gradient vector from infinitely increasing (a constraint under which the magnitude of the gradient vector is normalized to 1). Expanding the dispersion expression can give the expression summarized as follows.

$$\text{Var}(z) = \frac{1}{Num(N)} \sum_s z_s^2 \quad (13)$$

$$= \frac{1}{Num(N)} \sum_s (\partial x v_x + \partial y v_y)^2$$

$$= \frac{1}{Num(N)} \left( \left(\sum_s \partial x^2\right) v_x^2 + 2\left(\sum_s \partial x \partial y\right) v_x v_y + \left(\sum_s \partial y^2\right) v_y^2 \right)$$

$$= v^T \left( \frac{1}{Num(N)} \sum_s \begin{bmatrix} \partial x^2 & \partial x \partial y \\ \partial x \partial y & \partial y^2 \end{bmatrix} \right) v$$

$$\equiv v^T H v$$

Rewriting the optimizing problem mentioned previously gives expression (14).

$$\max_{v,\lambda} v^T H v + \lambda(1 - v^T v) \quad (14)$$

The optimality necessary conditions of the above optimizing problem can be calculated as follows.

$$Hv - \lambda v = 0 \quad \text{first expression}$$

$$1 - v^T v = 0 \quad \text{second expression}$$

The second expression is a necessary condition for satisfying the constraint. After the constraint is satisfied, the first expression should be solved. Consequently, the following solution of an eigenvalue-eigenvector problem is the result of the principal component analysis.

$$Hv = \lambda v \quad (15)$$

Therefore, the main edge direction and magnitude representing the local structure of the image is the above solution of the eigenvalue-eigenvector problem. The eigenvalue and the rotation angle θ between the x-axis of the edge direction can be calculated as follows.

$$\lambda_\pm = \frac{H_{xx} + H_{yy}}{2} \pm \sqrt{\frac{(H_{xx} - H_{yy})^2}{4} + H_{xy}^2} \quad (16)$$

$$\theta = \frac{1}{2} \tan^{-1} \frac{2H_{yy}}{H_{xx} - H_{yy}}$$

Note that the following is given.

$$H = \begin{bmatrix} H_{xx} & H_{xy} \\ H_{xy} & H_{yy} \end{bmatrix}$$

From the calculations mentioned above, a parameter set $(\theta, \lambda_+, \lambda_-)$ for each pixel can be calculated in advance.

According to the image processing apparatus of the present embodiment, an optimized filter factor is obtained by matching between Histograms of Oriented Gradients. This enables smoothing to be adaptively performed even for various edge shapes to enable prevention of degradation in image quality due to excessive smoothing.

A second embodiment differs from the first embodiment particularly in that an image that is decoded after being coded by a coding method as exemplified in JPEG (joint photographic experts group) and MPEG (moving picture coding experts group) 1 and 2 is assumed as an input image. Upon coding, the image is basically DCT (discrete cosine transformation) coded on a block-to-block basis. Upon decoding, decoding is performed on the block-to-block basis to obtain the image. Because decoding is performed discretely on the block-to-block basis, a false edge called blocking artifacts might be generated at the block boundary upon decoding. This is sensed as degradation in image quality. The second embodiment relates to a method of obtaining a good image with less blocking artifacts by estimating a block boundary and performing a process in accordance with the estimated result.

Figure 8:
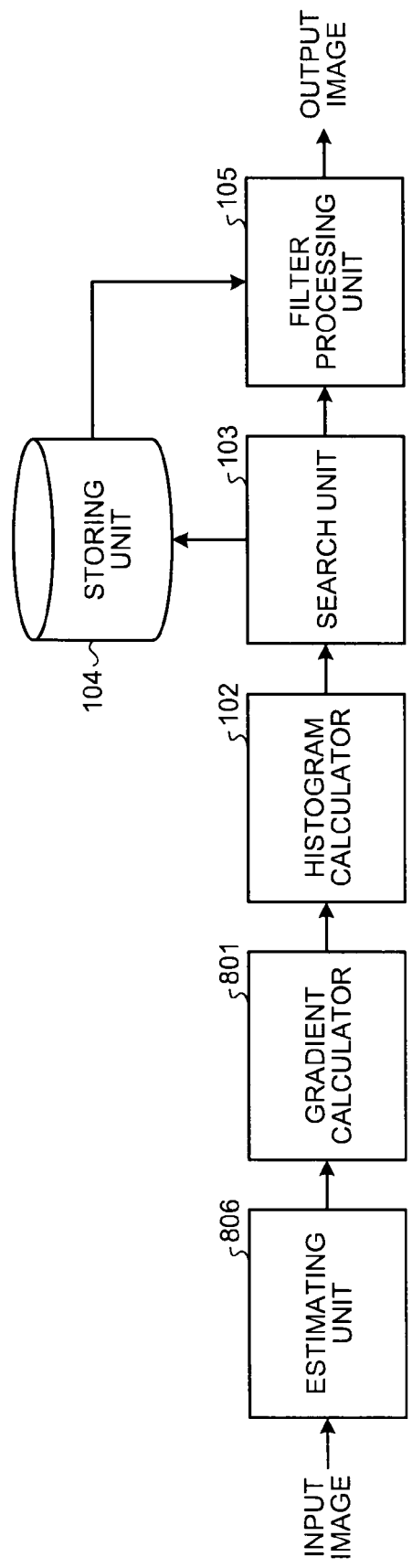
FIG. 8 is a block diagram of an image processing apparatus according to a second embodiment.

An image processing apparatus according to the second embodiment differs from the first embodiment in including an estimating unit 806 as illustrated in FIG. 8 and in a method of calculating the magnitude and direction of a pixel gradient by a gradient calculator 801.

The estimating unit 806 estimates a boundary of a block (hereinafter referred to as a "block boundary"), which functions as a conversion unit upon coding an input image, in a frame. Any method can be used as a method of estimating the block boundary. For example, when a block size as coding information is input together with an input image, the block boundary may be estimated from the block size. If coding information of an input image is not obtained but additional information is obtained, the block boundary is estimated using the additional information. The additional information used for estimating the block boundary may be format information, MIME (multipurpose Internet mail extensions) information, which is character strings for specifying the format of data, or the like of a file. For example, coding can be estimated to be performed in a size of 8×8 (pixels) in the case where the kind of a file of an input image is JPEG, in a size of 8×8 in the case of MPEG, and in a size of 4×4 in the case of H.264. Without depending on additional information, it may be estimated that a conversion process of coding is performed in a given block size that is often used, such as 8×8, and that the boundary between blocks having the given size is the block boundary.

The gradient calculator 801 calculates a pixel gradient of each pixel as in the first embodiment. In its latter stage, when the direction and magnitude of an edge is calculated, a process based on information on a block boundary estimated by the estimating unit 806 is performed. The details thereof are to be described later.

Figure 9:
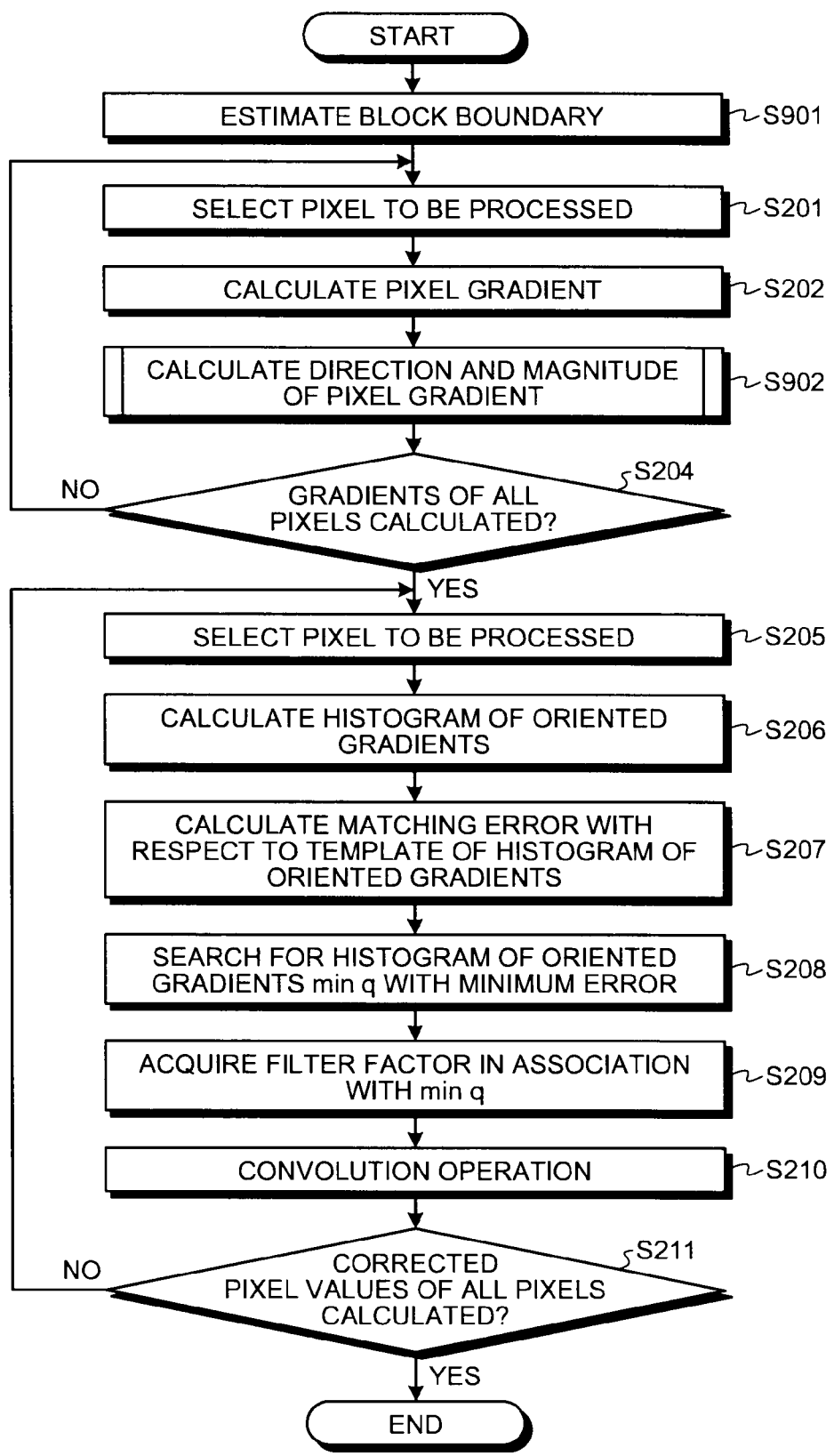
FIG. 9 is a flow chart of the image processing of the second embodiment.

Next, referring to FIG. 9, image processing of the second embodiment is described. Descriptions on the same processes as those in the first embodiment are omitted.

First, the estimating unit 806 estimates a block boundary of an input image (step S901). The estimating unit 806 transmits information on the estimated block boundary to the gradient calculator 801. Then, in steps S201 and S202, the same processes as those in the first embodiment are performed.

Next, the gradient calculator 801 calculates the magnitude and direction of a pixel gradient based on the information on the block boundary estimated in step S901 (step S902). In the following, an example is described in which the estimating unit 806 estimates a boundary formed by dividing a frame in a block size of 8×8 as the block boundary. Block boundaries are assumed to be present at positions of 8×8 intervals from the top-left corner of the image. A pixel gradient at the block boundary is unreliable because blocking artifacts may be generated. Therefore, the pixel gradient obtained for the block boundary is controlled by multiplying it by a certain scale so as to reduce the influence of the pixel gradient.

Processes in steps S203 to 5211 are performed as those in the first embodiment.

Referring to FIG. 10, a description is given to the details of the process of calculating the magnitude and direction of the pixel gradient performed in step S902. Initially, the gradient calculator 801 determines from the information on the block boundary estimated by the estimating unit 806 whether a block boundary presents between the pixels being processed $(i, j)^T$ and $(i+1,j)^T$ (step S9021). In the case of i mod 8=0, the result is "YES" in step S9021. Here, a mod b is an operator for calculating a remainder when a is divided by b. If the result is "YES" in step S9021, the process proceeds to step S9022. If "NO" in step S9021, the process proceeds to step S9023.

Next, as illustrated in expression (17), a value $\partial x'_{i,j}$ calculated in step S202 is rewritten to a value $\alpha \partial x'_{i,j}$ obtained by multiplying the value $\partial x'_{i,j}$ by $\alpha$ (step S9022).

$$\partial x'_{i,j} = \alpha \partial x_{i,j} \qquad (17)$$

where $\alpha$ is a constant in the range $0 \leq \alpha < 1$. This makes it possible for a value of the gradient between pixels striding across a block boundary to have no influence on a Histogram of Oriented Gradients when $\alpha=0$. Even without using a pixel gradient of a block boundary, a Histogram of Oriented Gradients can be produced using gradients of neighboring pixels. Thus, even when an edge straddling the block boundary presents, a Histogram of Oriented Gradients adaptive to the edge can be produced.

Next, the gradient calculator 801 determines, from the information on the block boundary estimated by the estimating unit 806, whether a block boundary presents between pixels being processed $(i, j)^T$ and $(i, j+1)^T$ (step S9023). In the case of j mod 8=0, the result is "YES" in step S9021. If the result is "YES" in step S9023, the process proceeds to step S9024. If "NO" in step S9023, the process proceeds to step S9025.

$$\partial y'_{i,j} = \alpha \partial y_{i,j} \qquad (18)$$

Next, as in step S203 in the image processing procedure of the first embodiment, the magnitude d and the direction θ of a pixel gradient are calculated using the held values $\partial x'_{i,j}$ and $\partial y'_{i,j}$ (if the values are rewritten in steps S9022 and 9024, the rewritten values are used)(step S9025).

According to the present embodiment, in the process of calculating the magnitude of the pixel gradient (step S902), a process that multiplies a pixel gradient by a coefficient α is performed for a pixel gradient striding across a block boundary. This enables a Histogram of Oriented Gradients with less influence of a pixel gradient striding a block boundary to be produced in a process of producing a Histogram of Oriented Gradients (step S205), which is to be performed later.

Thus, according to the image processing apparatus of the present embodiment, smoothing in accordance with the shape of an edge can be performed in an adaptive manner based on a Histogram of Oriented Gradients in which an influence of a false edge caused by a pixel gradient striding a block boundary is excluded as much as possible.

The image processing apparatuses of the foregoing embodiments can be implemented, for example, using general purpose computers as their basic hardware. Programs to be executed are made in modules including the functions described above. The programs, in a file in an installable format or an executable format, may be provided in such a way that they are recorded on a recording medium readable by a computer, such as a CD-ROM, a CD-R or a DVD. They may also be provided in such a way that they are incorporated in advance in a ROM or the like.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus comprising:
a gradient calculator configured to calculate a direction and a magnitude of a gradient of each pixel in an input image using neighboring pixel values;
a histogram calculator configured to calculate a Histogram of Oriented Gradients, which contains a plurality of sampled directions, from the directions and the magnitudes of the gradients calculated for the pixels in a region including the pixel being processed of the input image;
a storing unit configured to store a plurality of smoothing filters and a template of Histogram of Oriented Gradients in association with each other;
a search unit configured to calculate errors between the Histogram of Oriented Gradients calculated for the pixel being processed and the Histograms of Oriented Gradients stored in the storing unit and search the Histograms of Oriented Gradients stored in the storing unit for the Histogram of Oriented Gradients that has a minimum error; and
a filter processing unit configured to acquire one of the smoothing filters that is stored in association with the Histogram of Oriented Gradients having the minimum error from the storing unit and determine a corrected pixel value of the pixel being processed by filter processing with the acquired smoothing filter.

2. The apparatus according to claim 1, wherein the search unit is configured to calculate the error by taking a sum of absolute value of a difference between the template of the Histograms of Oriented Gradients stored in the storing unit and the Histogram of Oriented Gradients calculated by the histogram calculator.

3. The apparatus according to claim 1, wherein the search unit is configured to calculate the error by taking a sum of squared value of a difference between the template of the Histograms of Oriented Gradients stored in the storing unit and the Histogram of Oriented Gradients calculated by the histogram calculator.

4. The apparatus according to claim 1, further comprising an estimating unit configured to estimate a boundary of a block in a frame, the block being a conversion unit when the input image is coded, and
wherein the histogram calculator is configured to perform control so as to cause an influence given upon calculating the Histogram of Oriented Gradients using the direction and the magnitude of the gradient between pixels striding across the estimated boundary of the block to be smaller than that when using the direction and the magnitude of the gradient between pixels not striding across the estimated boundary of the block.

5. The apparatus according to claim 4, wherein the estimating unit is configured to set in advance a predetermined block including a plurality of pixels and multiply a vector of the gradient of the pixel adjacent to the boundary of the block by a predetermined factor set in advance.

6. The apparatus according to claim 4, wherein the estimating unit is configured to estimate, as the block boundary, a boundary upon dividing the input image by a given size.

7. The apparatus according to claim 4, wherein the estimating unit is configured to obtain coding information of the input image and estimate a block size from the coding information.

8. The apparatus according to claim 1, wherein the filter processing unit is configured to determine the corrected pixel value of the pixel being processed using a weighted sum of pixel values of the pixels in the region in accordance with weighting factors determined by the filter, and
the weighting factors of the smoothing filter stored in the storing unit decrease as a distance from the pixel being processed increases, and a decreasing rate of the weighting factors is high in a direction along which the gradient of the associated Histogram of Oriented Gradients is large and is low in a direction along which the gradient of the Histogram of Oriented Gradients is small.

9. An image processing method comprising:
calculating a direction and a magnitude of a gradient of each pixel in an input image using neighboring pixel values;
calculating a Histogram of Oriented Gradients, which contains a plurality of sampled directions, from the directions and the magnitudes of the gradients calculated for the pixels in a region including the pixel being processed of the input image;
calculating, while referring to a storage unit that stores a plurality of smoothing filters and Histograms of Oriented Gradients in association with each other, errors between the Histogram of Oriented Gradients calculated for the pixel being processed and the Histograms of Oriented Gradients stored in the storing unit;
searching the Histograms of Oriented Gradients stored in the storing unit for the Histogram of Oriented Gradients that has a minimum error;
acquiring one of the smoothing filters that is stored in association with the Histogram of Oriented Gradients having the minimum error from the storing unit; and
determining a corrected pixel value of the pixel being processed by filter processing with the acquired smoothing filter.

* * * * *